Feb. 16, 1965   C. J. TABOR, JR   3,170,115
VOLTAGE BREAKDOWN TEST CIRCUIT
Filed July 20, 1960   2 Sheets-Sheet 1
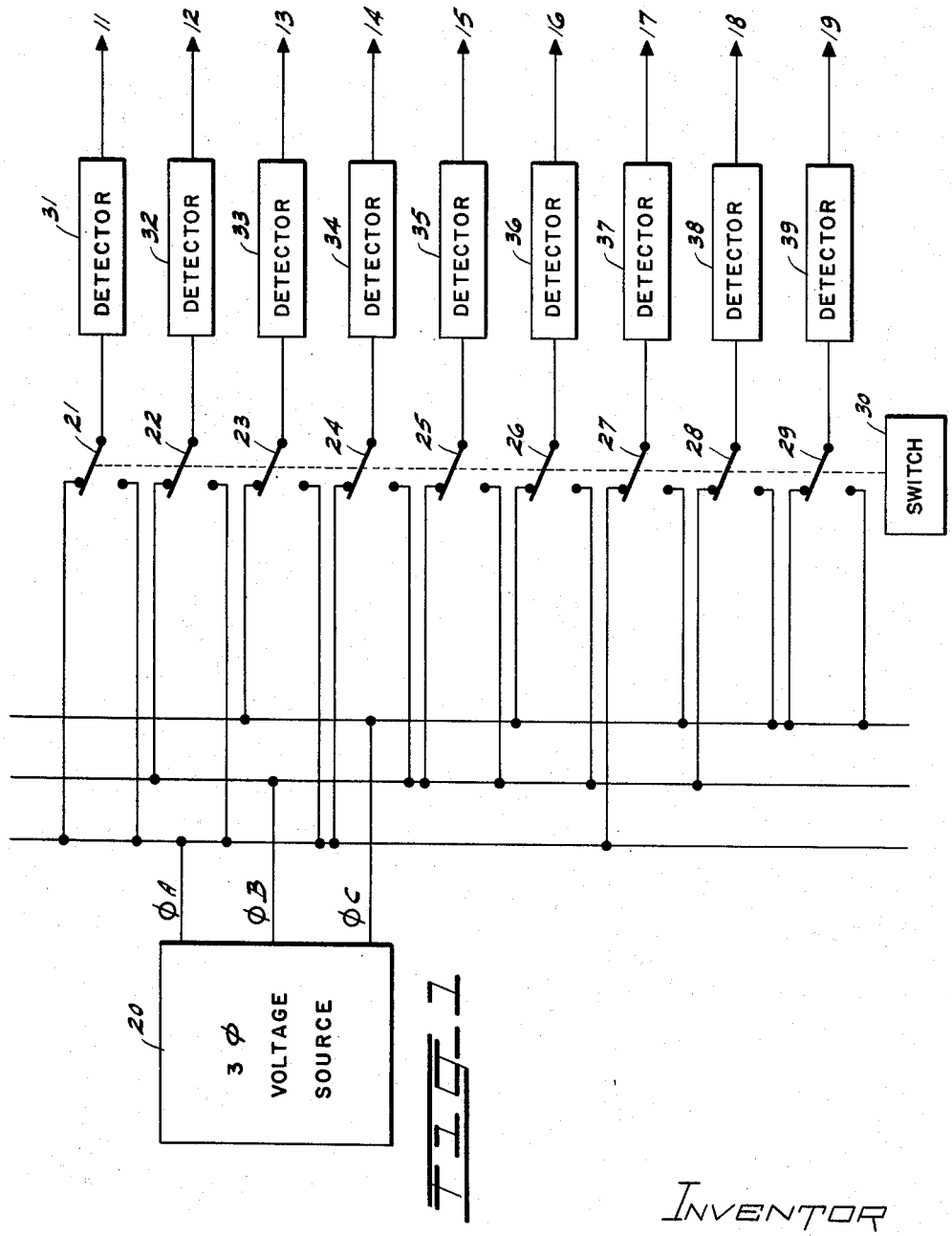
INVENTOR
C. J. TABOR JR.
By S. Gundersen
ATTORNEY

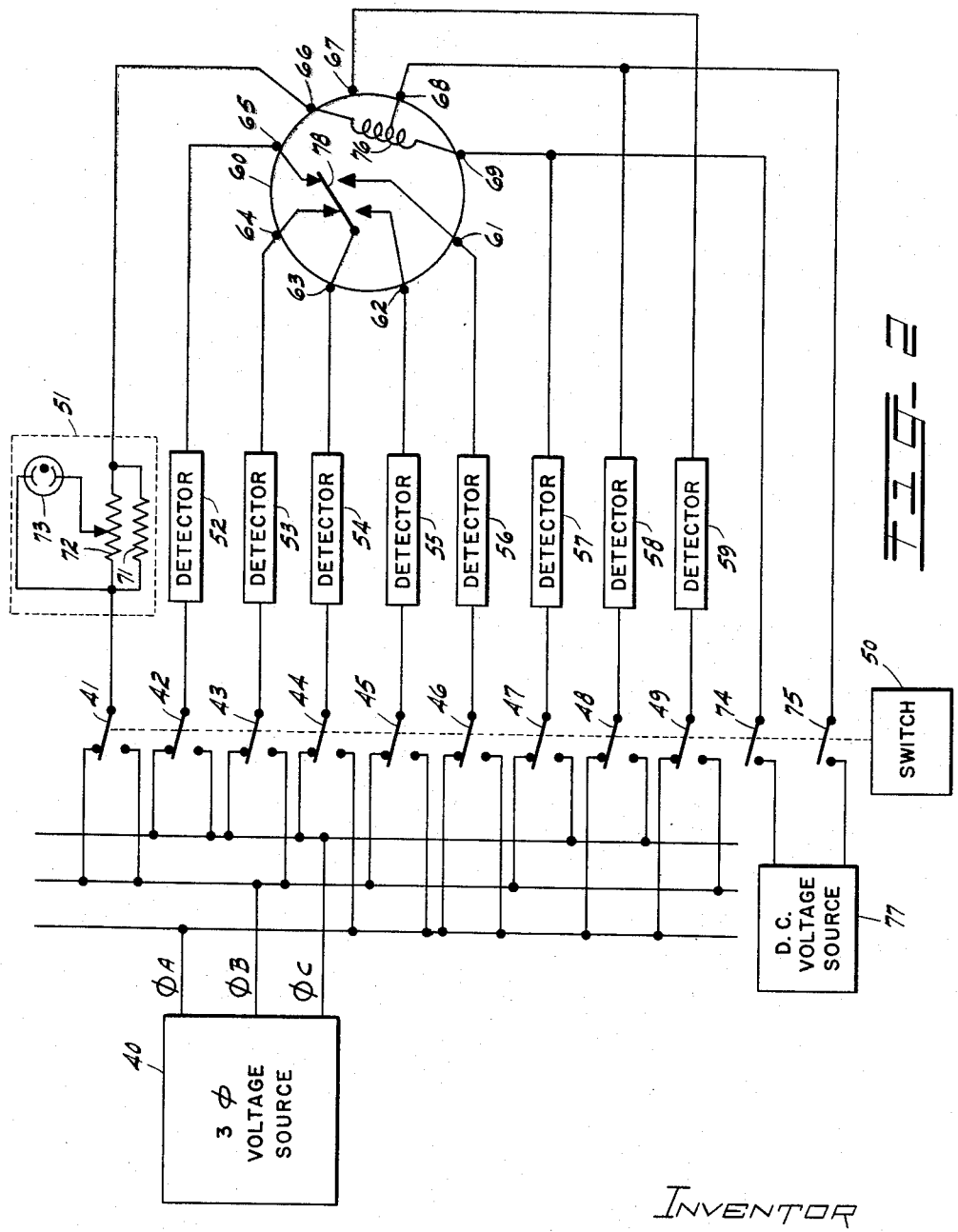

United States Patent Office 3,170,115
Patented Feb. 16, 1965

3,170,115
VOLTAGE BREAKDOWN TEST CIRCUIT
Clarence J. Tabor, Jr., Schnecksville, Pa., assignor to Western Electric Company, Incorporated, New York, N.Y., a corporation of New York
Filed July 20, 1960, Ser. No. 44,053
5 Claims. (Cl. 324—51)

This invention relates to devices for determining electrical characteristics between conductors and particularly to devices for testing leakage between normally insulated conductive elements and conductivity between elements normally joined by a conductive path.

The necessity in electrical devices of restricting current flow to the conductive paths designed to accommodate such flow and of minimizing current flow elsewhere is obvious and basic. Consequently, current continuity and leakage tests are of principal importance in determining the adequacy of circuitry or components for their intended purpose. Tests of this type are usually simple and involve applying a test voltage between two points and evaluating the current flow or non-flow in terms of the requirements of the system.

For certain types of equipment, however, particularly those having a number of points each of which must be tested against every other point, the establishment of the multiple, successive contacts is quite time consuming and costly. In large scale production there is an increasing tendency for 100 percent testing of the product to insure reliability, and the undesirable high test costs urge particularly toward reduction of test time. Examples of such products are electron tubes and relays in both of which interelectrode or intercontact leakage must be strictly controlled. The problem can be appreciated by considering that it is common for relays to have as many as nine independent elements. Hence, in order to test each element with every other element, a series of thirty-six separate tests must be made.

It is, therefore, an object of the invention to reduce continuity and leakage testing time when a plurality of elements must be tested in pairs.

Another object of the invention is to provide a device which can simultaneously test between several of the points to be tested for either leakage or continuity and after a simple switching action simultaneously complete the remaining tests so that every point has been tested with every other point in only two steps.

The invention is embodied in testing devices for determining electrical leakage or continuity between pairs of a plurality of elements. A source of polyphase voltage is connected so that approximately equal numbers of different elements are connected to each phase. Detectors are connected to each element for indicating an excess of leakage current between elements in the leakage test device or a deficiency of current in the continuity test device.

In accordance with one feature of the invention, switching is provided to transfer elements which shared the same phase to different phases so that in two steps every element is tested against every other element.

In one specific embodiment of the invention particularly useful for the leakage testing of relays in which certain elements are shorted together by a contact arm, the device includes means for applying power to transfer the arm and isolate the previously shorted elements. The now isolated elements are connected to the different input phases so that leakage tests can be made between them.

The invention will be described in connection with the drawing in which:

FIG. 1 is a schematic of the general embodiment of the invention utilizing a three-phase test voltage; and FIG. 2 is a schematic of a relay leakage tester according to the invention.

Referring now to the drawing, FIG. 1 represents a general embodiment of the invention appropriate for either a continuity or leakage test when nine or fewer elements shown generally as 11–19 are to be individually checked with every other element. The combination of nine elements taken two at a time requires thirty-six separate tests.

Reduction of the time involved in making thirty-six independent tests is realized by the application of two features. First, a three-phase ($\phi A$, $\phi B$, $\phi C$) source 20 of alternating current test voltage is used. This permits three elements to be connected to each phase: $\phi A$–11, 14, 17; $\phi B$–12, 15, 18; $\phi C$–13, 16, 19. Each element can be tested against each of the elements connected to the other phases simultaneously. Second, since each phase is connected to more than one element, several groups of contacts are being tested at the same time. Thus, each element on $\phi A$ will be tested against all three elements on $\phi B$ and all three elements on $\phi C$, and eighteen tests can be made at one time.

The remaining eighteen tests involving those elements which shared a common phase during the first eighteen tests are accomplished by switching the phase-element connections to new combinations by means of ganged switch 30 which throws the contact arms 21–29, associated with elements 11–19, respectively, to their lower position. The new combination of elements and phases is then as follows: $\phi A$–11, 12, 13; $\phi B$–14, 15, 16; $\phi C$–17, 18, 19. All of the pairs not tested in the first combination are tested simultaneously after the switching action of combination altering switch 30. All of the thirty-six tests required have been accomplished with one switching action and two test periods, saving the time that would have been expended on thirty-four tests.

Detection circuits 31–39 are connected to each one of the elements 11–19. Detectors 31–39 will, of course, be different for the leakage and the continuity tests. The detector 51 of FIG. 2 shows a convenient and simple form of detector for the leakage test and will be described more completely in connection with the embodiment of FIG. 2. The leakage detector is essentially senistive to high current while an appropriate continuity tester would be sensitive to low current values. Any one of the large number of current sensitive devices known in the art may be used.

FIG. 2 represents schematically one embodiment of the invention used for checking breakdown or leakage between elements (61–69) of a mercury relay 60. For purposes of illustration, the standards to which relay 60 is subjected are taken from the standards from an actual relay. The breakdown test in this case is achieved by applying 1,000 volts across each of the two relay elements through suitable dropping resistors analogous to resistor 71 in detector 51. Potentiometer 72 may be adjusted so that the indicator lamp 73 will glow when a given resistance is inserted between any two detector circuits but will not glow when a larger resistance is connected in the same phase.

Elements that are electrically connected either by sharing the same phase or by being shorted to a common point cannot be leakage checked one against the other. The arrangement of contacts in relay 60 thus precludes the testing of elements 63, 64 and 65 against each other when the relay is de-energized. Consequently, these elements are placed in the same phase when the relay is de-energized and in different phases when the relay is energized. Conversely, elements 61, 62 and 63 are incapable of being checked against each other when the relay is energized, but are capable of being checked one against the other when the relay is de-energized. Thus, these elements are connected in different phases when the relay is de-energized and in the same phase when the relay is energized.

Technically, it is not possible to check the elements 66, 68 and 69 of the relay coil 76 against each other for leakage, since an ohmic path does exist between those points. However, it is possible by applying test voltage to those points and by adjusting the associated detectors to check the integrity of the coil, that is, to check that no leakage exists between the coil windings. If any leakage exists between the coil windings the resistance of the coil 76 will be less than the specified value and the detectors associated with that portion of the coil 76 wherein the leakage exists will light.

Power supplied by D.C. power source 77 applies actuating voltage to the coil 76 through switch contacts 74 and 75 when switch 50 has moved 74 and 75 to their lower position. This application of power to the coil pulls the contact arm 78 associated with element 63 to its lower position while switch contacts 42, 43 and 44 simultaneously place elements 63, 64 and 65, respectively, in different phases. At the same time switch contacts 44, 45 and 46 place the elements 61, 62 and 63 in $\phi A$. Actuation of the combination altering switch 50 places the contacts 41–49 in their lower position. This functions to place those elements in a different position which shared a common phase with the switch contacts 41–49 in their upper position. In this way, all the elements are checked against all other elements in only two tests. Since each element has its own indicator 73, no disadvantage results from having elements connected to each phase as the test will shown breakdown between an element in one phase and any element in the other two phases by lighting the two indicator lamps, one in each of the two phases, between which the breakdown occurs.

It is to be understood that the above described arrangements are simply illustrative of the principles of the invention. Other arrangements may be readily devised by those skilled in the art, to accommodate the invention to numerous practical situations, which will embody the principles of the invention and fall within its spirit and scope.

What is claimed is:

1. Apparatus for testing a plurality of elements to determine whether there is any leakage therebetween, which comprises:

a source of polyphase voltage having a plurality of output leads corresponding to the different phases thereof;

switching means selectively operable from a first to a second position for connecting said elements to the output leads of said polyphase voltage source, in said first position a plurality of first groups of the elements being connected to said output leads in a manner such that each of said first groups is connected to a different output lead, and in said second position a plurality of second groups of the elements being connected to said output leads in a manner such that each of said second groups is connected to a different output lead, said first and second groups being selected such that those elements belonging to the same first group are each in a different second group;

means connected to each element and responsive to a predetermined current therethrough for indicating leakage between that element and any of the other elements; and means for operating said switching means from its first to its second position whereby each of said elements is tested for leakage to any of the other of said elements.

2. Apparatus for testing a plurality of elements to determine whether there is any leakage therebetween, which comprises:

a three phase voltage source having three output leads, one for each of said three phases;

a plurality of current indicating detectors having first and second input terminals, each detector first input terminal being connected to one of the elements;

switching means selectively operable from a first to a second position for connecting said detectors to the output leads of said polyphase voltage source, in said first position a plurality of first groups of the detectors being connected to said output leads in a manner such that each of said first groups is connected to a different output lead and in said second position a plurality of second groups of the detectors being connected to said output leads in a manner such that each of said second groups is connected to a different output lead, said first and second groups being selected such that those detectors belonging to the same first group are each in a different second group; and means for operating said switching means from its first to its second position whereby each of said elements is tested for leakage to any of the other of said elements.

3. Apparatus for testing a plurality of elements to determine whether there is any leakage therebetween, some of said elements being normally in electrical contact with one another and the other of said elements being electrically isolated from one another, which apparatus comprises:

a polyphase source of electrical voltage having a plurality of output leads, at least one for each phase;

switching means selectively operable from a first to a second position for connecting groups of said elements to different output leads of said polyphase voltage source with one group being connected to each output lead, in said first position those elements normally in electrical contact being members of the same group and in said second position those elements which were members of the same group in said first position being members of a different group;

means connected to each element and responsive to a predetermined current therethrough for indicating leakage between that element and any of the other elements;

means for electrically isolating from each other those elements which are normally in electrical contact with one another; and means for operating said switching means from its first to its second position whereby each of said elements is tested for leakage to any of the other elements.

4. Apparatus for testing a plurality of elements to determine whether there is any leakage therebetween, some of said elements being normally in electrical contact with one another and the other of said elements being electrically isolated from one another, which apparatus comprises:

a three phase voltage source having three output leads, one for each of said three phases;

a plurality of current indicating detectors having first and second input terminals, each detector first input terminal being connected to one of the elements;

switching means operable from a first to a second position for connecting the second input terminals of said detectors to the three output leads of said three phase voltage source with approximately one-third of the detectors being connected to each output lead, in said first position the detectors connected to those elements normally in electrical contact with each other being connected to the same output lead and in said second position those detectors connected to the same output lead in said first position being connected to different output leads;

means for electrically isolating from each other those elements which are normally in electrical contact with one another; and means for operating said switching means from its first to its second position whereby each of said elements is tested for leakage to any of the other elements.

5. Apparatus according to claim 4 in which each current indicating detector includes a two-element glow discharge tube having a variable impedance parallelly connected thereacross.

References Cited in the file of this patent

UNITED STATES PATENTS

| | | |
|---|---|---|
| 1,918,834 | Crago | July 18, 1933 |
| 2,094,645 | Foulke | Oct. 5, 1937 |
| 2,509,815 | Elliot | May 30, 1950 |
| 2,593,225 | Van Ryan et al. | Apr. 15, 1952 |
| 2,610,229 | Cranford | Sept. 9, 1952 |
| 2,805,391 | Meadows et al. | Sept. 3, 1957 |
| 2,806,185 | Oberman | Sept. 10, 1957 |

FOREIGN PATENTS

| | | |
|---|---|---|
| 737,746 | Great Britain | Sept. 28, 1955 |

OTHER REFERENCES

Check That Ground, article in Allis-Chalmers Electrical Review, 2nd Quarter 1948.